(12) United States Patent
Robinson et al.

(10) Patent No.: US 7,575,736 B2
(45) Date of Patent: Aug. 18, 2009

(54) PROCESS FOR THE PRODUCTION OF ULTRAFINE PLATE-LIKE ALUMINA PARTICLES

(75) Inventors: John Sydney Robinson, Iluka (AU); Lara Michelle Heatley, San Francisco, CA (US); Takuya Tsuzuki, Winthrop (AU); David Andrew Lee, Cottesloe (AU); Paul Gerard McCormick, Nedlands (AU)

(73) Assignee: Advanced Nano Technologies Pty. Ltd., Welshpool (AU)

( * ) Notice: Subject to any disclaimer, the term of this patent is extended or adjusted under 35 U.S.C. 154(b) by 141 days.

(21) Appl. No.: 10/541,471

(22) PCT Filed: Jan. 6, 2004

(86) PCT No.: PCT/AU2004/000005

§ 371 (c)(1),
(2), (4) Date: Feb. 15, 2006

(87) PCT Pub. No.: WO2004/060804

PCT Pub. Date: Jul. 22, 2004

(65) Prior Publication Data

US 2006/0153769 A1    Jul. 13, 2006

(30) Foreign Application Priority Data

Jan. 7, 2003    (AU)    ............... 2003900030

(51) Int. Cl.
*C01F 7/02* (2006.01)

(52) U.S. Cl. .................... 423/625; 423/630
(58) Field of Classification Search ........... 423/625, 423/624, 629, 630

See application file for complete search history.

(56) References Cited

U.S. PATENT DOCUMENTS

| | | | |
|---|---|---|---|
| 5,277,702 A | 1/1994 | Thibault et al. | |
| 5,296,085 A | 3/1994 | Faure et al. | |
| 5,587,010 A | 12/1996 | Shibasaki et al. | |
| 5,702,519 A | 12/1997 | Nitta et al. | |
| 5,759,213 A | 6/1998 | Adair et al. | |
| 6,015,456 A | 1/2000 | Fukuda et al. | |
| 6,521,203 B1 * | 2/2003 | Mohri et al. | ........ 423/625 |
| 2007/0207084 A1 * | 9/2007 | Zachariah et al. | ........ 423/592.1 |

FOREIGN PATENT DOCUMENTS

| | | |
|---|---|---|
| JP | 356977 | 6/1960 |
| JP | 5571697 | 5/1980 |
| JP | 6054916 | 3/1985 |
| JP | 03043211 | 2/1991 |
| JP | 03131517 | 6/1991 |
| JP | 0465012 | 3/1992 |
| JP | 06329412 | 11/1994 |
| JP | 2001-058818 A1 | 3/2001 |
| WO | WO 90/15777 A1 | 12/1990 |

* cited by examiner

*Primary Examiner*—Wayne Langel
*Assistant Examiner*—James Fiorito
(74) *Attorney, Agent, or Firm*—The Webb Law Firm (57) ABSTRACT

A process for producing plate-like alumina particles with a high aspect ratio is described. Nano-sized particles of an aluminium precursor compound, optionally formed by milling, are mixed with a sufficient volume fraction of a diluent and heat treated to form substantially discrete plate-like alpha alumina particles dispersed in the diluent. A mineraliser may be added to lower the effective melting point of the system. Substantially discrete plate-like particles may be formed without agitation when the heat treatment is conducted below the melting point of the diluent.

17 Claims, 4 Drawing Sheets

PROCESS FOR THE PRODUCTION OF ULTRAFINE PLATE-LIKE ALUMINA PARTICLES

FIELD OF THE INVENTION

The present invention relates to a process for the production of substantially discrete ultra-fine plate-like particles of alumina with a high aspect ratio.

The present invention further relates to substantially discrete ultra-fine plate-like particles made using the processes described.

BACKGROUND TO THE INVENTION

Plate-like morphology is realised as a result of preferential growth of particles in crystallographic directions parallel to certain planes and slower growth mechanisms in directions other than this plane.

It is known that particles with a particular morphology can be generated by heat treatment in certain flux or diluent systems where the product phase is soluble in the flux or diluent. For example it has previously been shown that plate-like particles of bismuth tungstate can be grown during heat treatment of bismuth oxide and tungsten oxide in molten salt mixtures at temperatures above 650° C. Molten chlorides promoted plate-like growth, whereas molten sulphate salts did not. It is not known in the art to generate plate-like particles in solid state systems.

Plate-like particles have a significant potential for a wide range of applications including soft focus filler materials for cosmetics, polishing and lapping slurries, advanced ceramic materials, composites, hard coatings, paper coatings, die coatings, and substrate materials for pearlescent pigments.

Plate-like particles with a high aspect ratio and a low degree of aggregation and/or agglomeration are particularly attractive for these applications. "Aggregation" is a term that refers to the degree to which particles are loosely bound together to form clumps which have an increased effective particle size. "Agglomeration" is a term that refers to particles which are rigidly bound to each other, for example by partial fusion or intergrowth. As for aggregation, the effective particle size is increased. The degree of aggregation and/or agglomeration of particles is routinely assessed using a combination of scanning electron microscopy and laser light scattering particle size analysis. Close agreement between the average particle size determined by these two methods indicates that the particles being tested are substantially discrete ie have a low level or degree of aggregation and/or agglomeration.

Processes for the production of plate-like particles of alumina are known in the art. For example, platy alumina is commercially produced by the controlled calcination of aluminium trihydrate. A hydrothermal technique for the production of plate-shaped alumina particles is described in U.S. Pat. No. 5,587,010. With known techniques, the particles tend to be agglomerated, requiring the use of expensive post milling and classification processes (see for example U.S. Pat. No. 3,121,623 and U.S. Pat. No. 5,277,702) to separate the particles. The particles also tend to be of irregular shape and size, with minimum dimensions exceeding 1 micron and thus a relatively low aspect ratio.

Certain of the techniques directed specifically to achieving high aspect ratios and forming substantially discrete plate-like particles known in the prior art require uneconomical conditions of temperature and pressure to form plate-like particles. An example of such a technique is disclosed in U.S. Pat. No. 5,702,519 (Merck) which describes a process for the production of non-aggregated plates of alpha alumina with a high aspect ratio. The Merck patent discloses a process which involves the step of preparing aqueous solutions of water-soluble aluminium and titanium salts. Complete dissolution of these salts is essential to avoid agglomeration of the final product. The starting materials, ie the salts, are completely dissolved as a first step. The process of Merck is preferably conducted at high temperatures between 900 and 1400° C.

The present invention was developed with a view to providing an alternative process for the production of substantially discrete plate-like alpha alumina particles with a high aspect ratio.

It will be clearly understood that, although prior art use and publications are referred to herein, this reference does not constitute an admission that any of these form a part of the common general knowledge in the art, in Australia or in any other country.

Throughout this specification and in the appended claims, the term "comprising" is used inclusively, in the sense that there may be other features and/or steps included in the invention not expressly defined or comprehended in the features or steps subsequently defined or described. What such other features and/or steps may include will be apparent from the specification read as a whole.

SUMMARY OF THE INVENTION

According to a first aspect of the present invention there is provided a process for the production of plate-like alumina particles with a high aspect ratio, the process comprising the steps of:
  forming a mixture of nano-sized particles of an aluminium precursor compound and a sufficient volume fraction of a diluent; and
  heat treating the mixture to form substantially discrete plate-like alpha alumina particles dispersed in the diluent, characterised in that the step of heat treating the mixture is conducted below the melting point of the diluent.

The term nano-sized would be readily understood by persons skilled in the relevant art to refer to particles that are smaller than one micron in size. The preferred size range for the nano-sized particles of the present invention is less than 100 nm and preferably less than 50 nm.

It is to be clearly understood that the product of the process need not comprise only alpha alumina particles. For example, gamma alumina particles may also be present. Moreover, the temperature for the step of heat treating may be selected to control the relative amounts of gamma alumina particles and plate-like alpha alumina particles that form. For example, if a preferred product requires that only 50% of the particles be in the form of plate-like alpha alumina, the step of heat treating may be conducted at a lower temperature than that selected to produce a product requiring 90% plate-like alpha alumina particles.

Preferably the nano-sized particles of the aluminium precursor compound are substantially discrete, ie there is close agreement between the average particle size determined using scanning electron microscopy and laser light scattering particle size analysis.

Preferably, the process further includes the step of removing the diluent from the substantially discrete plate-like alpha alumina particles after the step of heat treating.

The term "diluent" here is used to describe a substance in solid or liquid form that "dilutes" the mixture and is added to help maintain separation of the particles of both the precursor alumina compound and/or the plate-like alpha alumina particles throughout the process. The diluent may react with the aluminium precursor compound or be present as a spectator.

Preferably, the diluent is soluble in a solvent which selectively removes the diluent and does not react with the plate-like alpha alumina particles and the step of removing the diluent after the step of heat treating comprises the step of washing with the solvent. More preferably the solvent is water or an alcohol.

Preferably, the sufficient volume fraction of the diluent is at least 80% of the total volume of the mixture.

While a wide range of diluents may be used, the preferred diluents are selected to encourage plate-like growth of the alpha alumina particles during heat treatment. A preferred diluent is a metal salt such as sodium sulphate, potassium sulphate or sodium chloride. Sodium chloride is highly preferred as being cheap and readily available.

A mineraliser in the form of a metal fluoride may also be added to the diluent to form a diluent-mineraliser system. The preferred metal fluorides are sodium fluoride, calcium fluoride, aluminium fluoride and sodium aluminium fluoride (cryolite).

The conditions for heat treatment of the mixture depend on the particular diluent or diluent-mineraliser system used. The advantage of using a diluent-mineraliser system is that the step of heat treating may be conducted at a lower temperature than for a diluent used alone.

Preferably, the step of heat treating the mixture is conducted below the diluent-mineraliser system in order to maintain separation between the plate-like particles as they form.

Preferably, the aluminium precursor compound is aluminium hydroxide. Aluminium hydroxide is cheap, readily available, easy to handle and readily dehydrates to form aluminium oxide.

The process described in WO 99/59754 and incorporated herein by reference may be used to produce substantially discrete nano-sized particles of an alumina precursor compound as the starting material for the process according to the first aspect of the present invention.

Other suitable aluminium precursor compounds include aluminium sulphate, aluminium nitrate and aluminium chloride. With these precursor compounds, the process preferably further comprises the steps of milling the aluminium precursor compound with a suitable diluent such as sodium hydroxide in accordance with the method described in the applicant's International application WO 99/59754, the contents of which are incorporated herein by reference.

According to a second aspect of the present invention there is provided a process for the production of substantially discrete ultrafine plate-like alumina particles having a high aspect ratio, the process comprising:

milling a mixture of an aluminium precursor compound and a sufficient volume fraction of a diluent to form a dispersion of nano-sized particles of an intermediate aluminium compound in the diluent; and, thereafter heat treating the dispersion to convert the nano-sized particles of the intermediate aluminium compound to substantially discrete plate-like particles of alpha alumina.

Preferably the process further comprises the step of removing the diluent such that ultra-fine plate-like particles are left behind in the form of an ultrafine powder. Preferably the step of removing the diluent includes the step of washing with a solvent which selectively dissolves the diluent while not reacting with the plate-like alumina particles.

The intermediate aluminium compound would typically be aluminium hydroxide or aluminium oxide. The precursor aluminium compound would typically be aluminium hydroxide.

According to a third aspect of the present invention there is provided a product in accordance with the processes described above. Such a product is suitable for use in the following applications: soft focus cosmetics, pearlescent pigments, ceramic components, die coatings, and hard coatings.

The plate-like alpha alumina particles produced in accordance with the various aspects of the present invention having an aspect ratio of width to diameter of between 1:10 and 1:100 and more preferably between 1:20 and 1:50. The preferred aspect ratio depends on the particular application for which the powders are required. The plate-like alumina particles have a diameter between 0.1 to 30 microns. Preferably the plate-like alumina particles have a thickness of between 50 and 200 nm.

BRIEF DESCRIPTION OF THE DRAWIWNGS

In order to facilitate a more detailed understanding of the nature of the invention, preferred embodiments of the process for the production of ultrafine plate-like alumina particles will now be described in detail, by way of example, only, with reference to the accompanying drawings, in which.

DETAILED DESCRIPTION OF THE PREFERRED EMBODIMENTS

Before illustrative examples of the present processes and products are described, it is understood that this invention is not limited to the particular diluents, mineralisers or aluminium precursor compounds described. It is also to be understood that the terminology used herein is for the purpose of describing particular examples only, and is not intended to limit the scope of the present invention. Unless defined otherwise, all technical and scientific terms used herein have the same meanings as commonly understood by one of ordinary skill in the art to which this invention belongs.

Although other types of diluents, mineralisers and precursor compounds as well as heat treatment operations similar or equivalent to those described herein can be used to practice or test the various aspects of the present invention, the preferred materials and processes are now described with reference to the production of plate-like alumina having a high aspect ratio.

It is to be clearly understood that the present invention is equally applicable to the production of a mixture of nano particles of gamma alumina as well as plate-like particles of alpha alumina.

The present invention is based on an initial observation of plate-like growth occurring for certain combinations of precursor aluminium compounds and diluents when the temperature of a mixture of nano-sized particles of an aluminium precursor compound were dispersed in a particular diluents and calcined (heated in air).

The choice of diluent would be found to also govern the temperature at which the transformation to a plate-like growth habit occurs during heat treatment. Suitable diluents include metal salts such as NaCl, $Na_2SO_4$, and $K_2SO_4$. A diluent-mineraliser system may be formed by mixing one or more of these diluents with a metal fluoride such as $AlF_3$, $Na_3AlF_6$ or mixtures thereof.

Depending upon the choice of diluent or diluent-mineraliser system, plate-like morphology can be generated with the diluent in solid or liquid form.

When heat treatment is performed at a temperature above the melting point the diluent(s) or above the liquidus of a diluent-mineraliser system, plate-like alumina particles tend to form interlocking clusters as a result of intergrowth in the liquid phase. To form substantially discrete plate-like particles under these conditions, the mixture is stirred.

When heat treatment is performed below the melting point of the diluent(s) or below the liquidus of the diluent-mineraliser system, intergrowth of plate-like particles is avoided by virtue of the fact that sufficient solid particles of the diluent are present to separate neighboring plate-like particles from one another during growth.

Throughout the following illustrative examples, aluminium hydroxide is used as the preferred aluminium precursor compound by way of example only and is not intended to limit the scope of the present invention in any way. When aluminium hydroxide is used as the precursor compound, the step of heat treating causes dehydroxylaton of the aluminium hydroxide as a first step. Nano-scale grains of gamma alumina form within the mixture and subsequently transform into plate-like particles of alpha alumina ($\alpha$-$Al_2O_3$) as the temperature of the heat treatment is further increased.

From the illustrative examples to follow and without wishing to be bound by theory it is understood that the following factors contribute to the formation of substantially discrete plate-like alpha alumina particles with a high aspect ratio:

a) The initial particle size of the aluminium precursor compound determines the minimum dimension of the plate-like particle, ie, its thickness. Thus, in order to achieve a minimum thickness of the plate-like alumina particles, the initial particle size of the precursor aluminium compound has been selected to be of nanometer dimensions. In the limit of no growth in the direction of slow growth, the minimum dimension (thickness) of the plate-like alumina particles would be equal to the initial particle size of the aluminium precursor compound.

b) The diluent should be present in sufficient volume fraction relative to the volume of particles of the precursor aluminium compound for the growing plate-like alumina particles to remain separated during heat treatment. A volume fraction of the diluent or diluent-mineraliser system in excess of 80% is preferred.

c) The diluent should be chosen to promote plate-like growth of the alumina particles during heat treatment. Specific salts and/or mineralisers have been shown to exhibit this property which, without wishing to be bound by theory, appears to be due to the stabilisation of particular interfaces during growth.

d) The step of heat treating may be carried out at a temperature either above or below the melting point of the diluent or liquidus of a diluent-mineraliser system. When the heat treatment is carried out at a temperature at which the diluent or diluent-mineraliser system is in a liquid phase, it has been found that the plate-like alumina particles tend to form interlocked clusters which is understood to be as a result of intergrowth in the liquid phase. Substantially discrete plate-like particles are produced by stirring the bath of liquid diluent or diluent-mineraliser system to prevent such intergrowth. Stirring may be achieved by mechanical mixing, rotation of the container, the use of convection currents, induction heating or any other method that imparts relative motion of the particles in the fluid, to prevent interlocking of the particles.

e) When heat treatment is performed below the melting point of the diluent or below the liquidus of a diluent-mineraliser system, it is understood that intergrowth of plate-like alumina particles is avoided by virtue of the fact that sufficient solid diluent or diluent-mineraliser system separates neighboring plate-like alumina particles from one another during growth. Stirring is not required when the step of heat treatment is conducted below the melting point of the diluent or liquidus of a diluent-mineraliser system.

In each of the illustrative examples described below, the diluent is water-soluble and is removed from the plate-like alumina particles after heat treatment by washing repeatedly, preferably with de-ionised water. Between washes, the plate-like alumina particles are separated from the wash solution either by settling in a 30-liter drum or by centrifugation in a 40 cc centrifuge tube, depending on the size of the sample. It is expected that a person skilled in the art may devise other methods for removing the diluent from the plate-like alumina particles without departing from the inventive concept of the present invention. For example, other solvents such as alcohols may be used. All such variations are considered to be within the scope of the present invention for which the following examples are for illustrative purposes only.

EXAMPLE 1

$Al(OH)_3$ in $Na_2SO_4$ Diluent, Stirred During Heat Treatment 180 g aluminium hydroxide as a precursor compound and 820 g sodium sulphate as a diluent were milled for 1 hour at 400 rpm in a 7 liter attrition mill using 25 kg of 6.35 mm diameter stainless steel balls to form nano-sized particles of aluminium hydroxide.

900 g of the resulting powder was added to a 4 liter alumina crucible containing 2.27 kg of pre-molten sodium sulphate at 1100° C. The mixture was mechanically stirred at 60 rpm by two alumina stirring rods during addition of the milled powder and for a further hour whilst the mixture was held at 1100° C.

Figure 1:
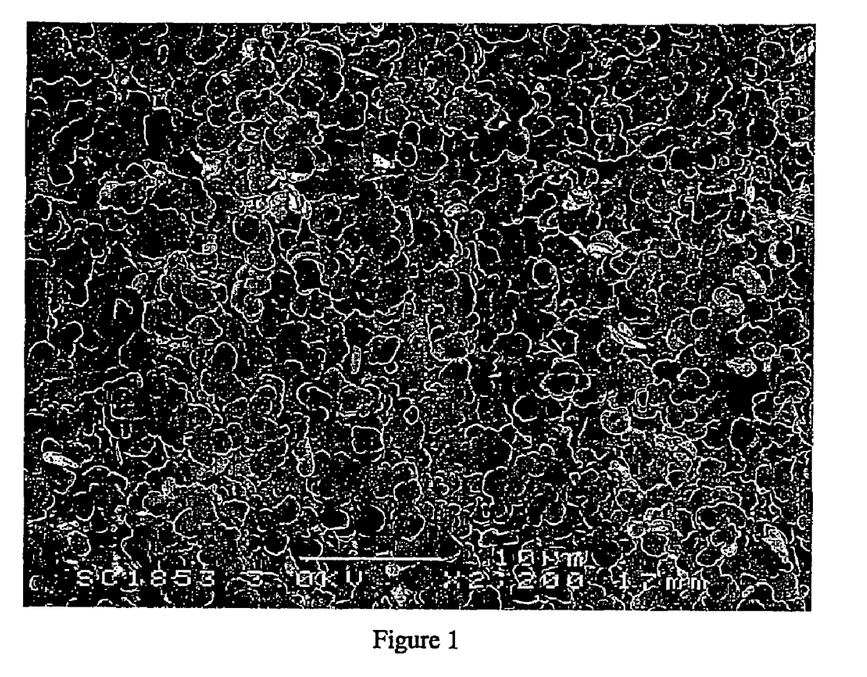
FIG. 1 is a Scanning Electron Micrograph of alumina plate-like particles in accordance with Example 1.

X-ray diffraction and electron microscopy studies confirmed that the resulting material consisted of platelets of alpha alumina 0.5-3 microns in diameter with thickness 50-100 nm. The plate-like alumina particles were substantially discrete as illustrated in the scanning electron micrograph of FIG. 1.

EXAMPLE 2

Al(OH)$_3$ in NaCl diluent without stirring 100 g aluminium hydroxide as a precursor compound and 1000 g sodium chloride as a diluent were milled for 2 hours at 600 rpm in a 7 liter attrition mill using 25 kg of 6.35 mm diameter stainless steel balls. The as-milled mixture consisted of nano particles of aluminium hydroxide, approximately 5 nm in size embedded in a sodium chloride matrix.

The resulting powder was heat treated in a sealed container at temperatures between 600 and 1300° C. The samples calcined between 600 and 800° C. consisted of equiaxed nano particles of gamma alumina. Calcining between 900 and 1200° C. resulted in a mixture of gamma and alpha alumina. Calcination at 1300° C. resulted in a single phase product which consisted of alpha alumina plate-like particles 50-100 nm thick and 0.5-5 microns in diameter.

Figure 2:
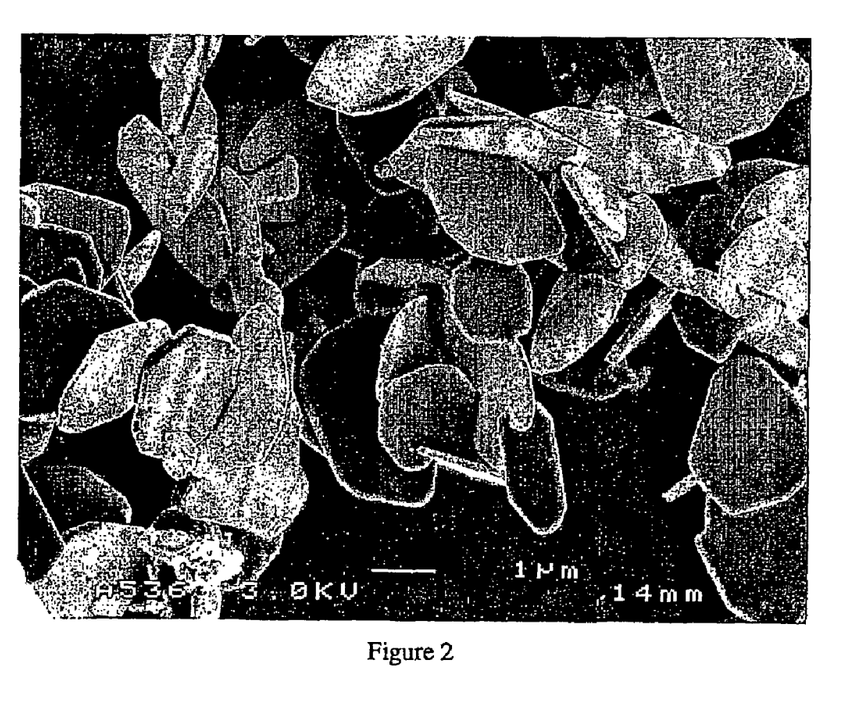
FIG. 2 is a Scanning Electron Micrograph of alumina plate-like particles, many of which are interlocked due to intergrowth made in accordance with Example 2.

FIG. 2 shows a scanning electron micrograph of this material, many of the plate-like alumina particles were found to be interlocked as a consequence of intergrowth.

EXAMPLE 3

Al(OH)$_3$ in NaCl Diluent, With Mineraliser, Solid State Heat Treatment Leading To 0.5-5 Micron Plate-Like Particles 1.04 g aluminium hydroxide as a precursor was milled with 6.88 g NaCl as a diluent and 0.08 g cryolite (Na$_3$AlF$_6$) as a mineraliser for 3 hours in a Spex mixer mill using 80 g of 12.7 mm diameter stainless steel balls to form nano-sized particles of aluminium hydroxide. Cryolite is known to be soluble in sodium chloride, forming a eutectic diluent-mineraliser system, with eutectic temperature 730° C.

A sample of the resulting powder was heat treated at 500° C. for 30 minutes and washed in de-ionised water, in order to examine the particle size prior to transformation to alpha phase. X-ray diffraction measurements confirmed that the resulting material was gamma alumina. Electron- microscopy studies revealed that the particles were equiaxed nano particles approximately 5 nm in size.

Figure 3:
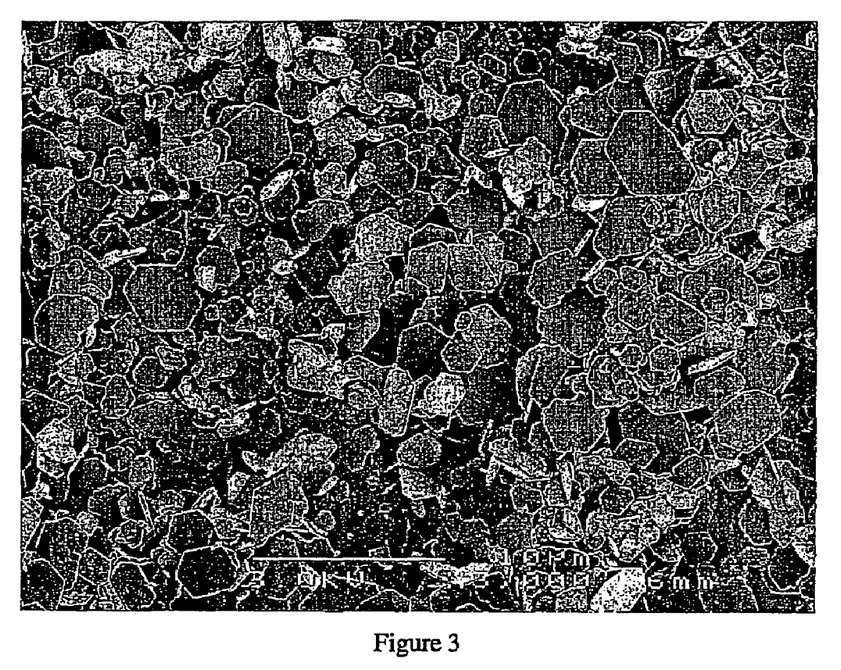
FIG. 3 is a Scanning Electron Micrograph of alumina plate-like particles made in accordance with Example 3.

The remaining powder was heat treated for 2 hours below the eutectic temperature, at 720° C. X-ray diffraction and electron microscopy studies confirmed that the resulting material consisted of platelets of alpha alumina 0.5-5 microns in diameter with thickness 50-100 nm. The particles were essentially individual platelets with low levels of agglomeration. FIG. 3 shows a scanning electron micrograph of the material produced using Example 3.

EXAMPLE 4

Al(OH)$_3$ in NaCl Diluent, With Mineraliser, Solid State Heat Treatment Below Liquidus Temperature Leading to 0.1-9 Micron Plate-like Particles 500 g aluminium hydroxide as a precursor compound was milled with 4450 g sodium chloride as a diluent and 50 g cryolite (Na$_3$AlF$_6$) as a mineraliser for 90 minutes in a 33 liter attrition mill at 270 rpm, using 100 kg of 6.35 mm diameter stainless steel balls to form nano-sized particles of aluminium hydroxide. The liquids temperature for diluent-mineraliser system composition is 795-800° C.

Figure 4:
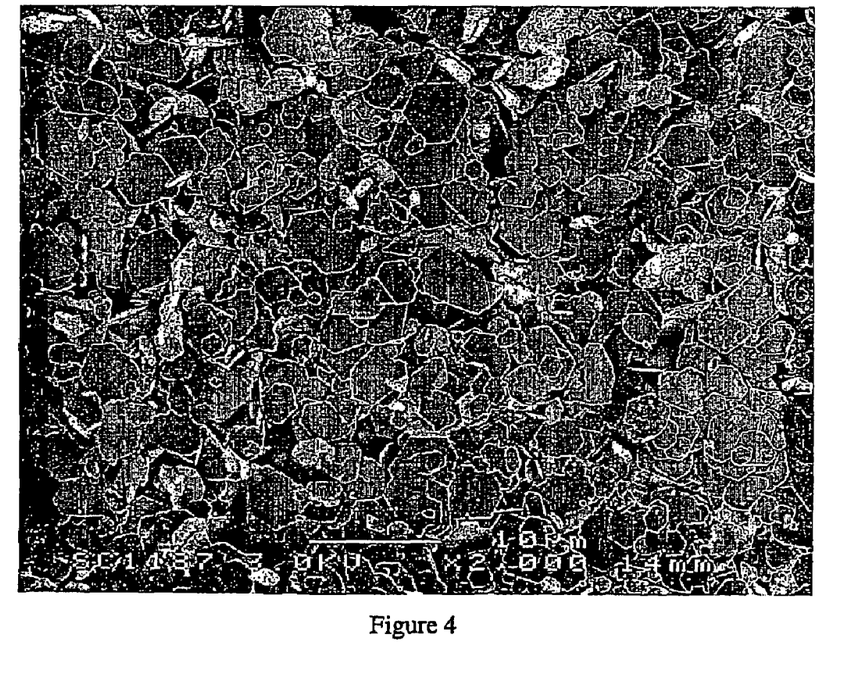
FIG. 4 is a Scanning Electron Micrograph of alumina plate-like particles made in accordance with Example 4.
Figure 5:
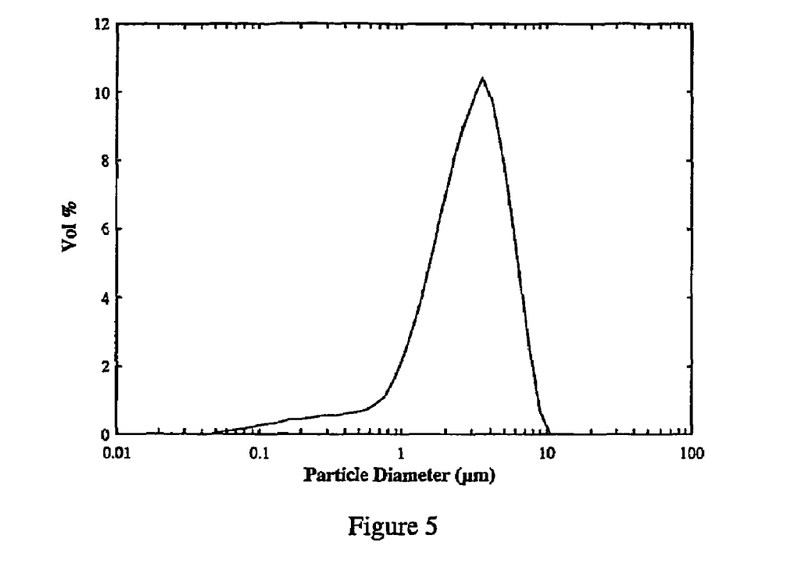
FIG. 5 is a graphical representation showing the size distribution of the diameter of the plate-like particles of FIG. 4.

The resulting powder was heat treated for 2 hours at 780° C. X-ray diffraction and electron microscopy studies confirmed that the resulting material consisted of plate-like particles of alpha alumina 0.1-9 microns in diameter with thickness 50-150 nm. The substantially discrete particles were essentially individual platelets with low levels of aggregation. FIG. 4 shows a typical scanning electron micrograph of this material. FIG. 5 shows the platelet size distribution in the sample produced in Example 4, determined by laser light scattering.

EXAMPLE 5

Partially Dehydrated Al (OH)$_3$ In NaCl Diluent With Mineraliser, Heat Treatment Below Liquidus Temperature Leading To 1-30 Micron Plate-Like Particles 650 g aluminium hydroxide as a precursor compound which had been dried to 23% mass loss at 230° C. was milled with 4300 g sodium chloride as a diluent and 50 g cryolite as a mineraliser for 90 minutes at 270 rpm in a 33 liter attrition mill using 100 kg of 6.35 mm diameter stainless steel balls to form an intermediate compound comprising nano-sized particles of aluminium hydroxide. X-ray diffraction measurements showed that the starting hydroxide material was predominantly boehmite (AlOOH), with a small fraction of gibbsite (Al(OH)$_3$) remaining.

Figure 6:
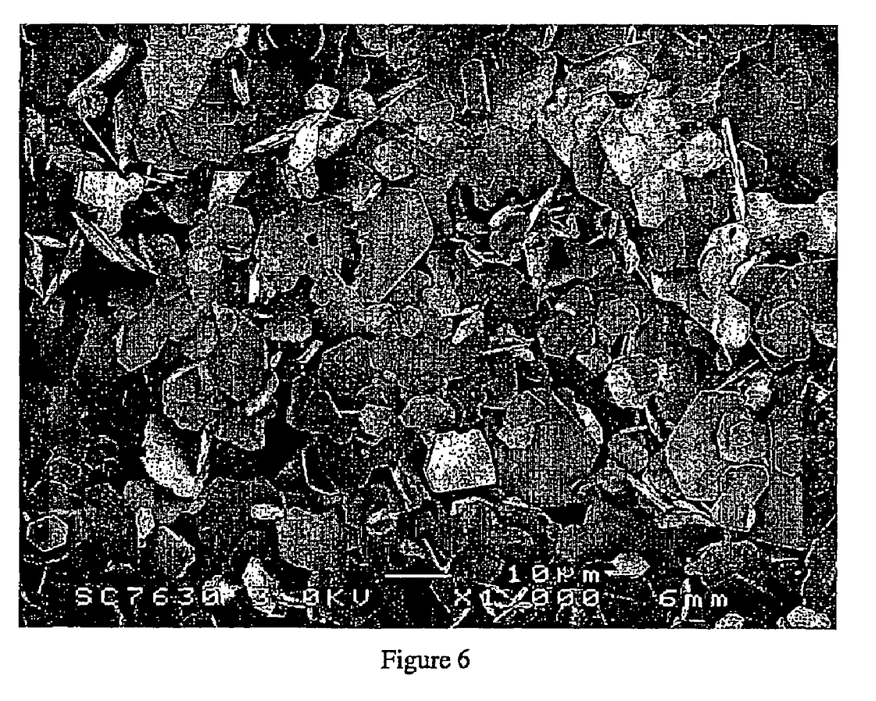
FIG. 6 is a Scanning Electron Micrograph of alumina plate-like particles made in accordance with Example 5.
Figure 7:
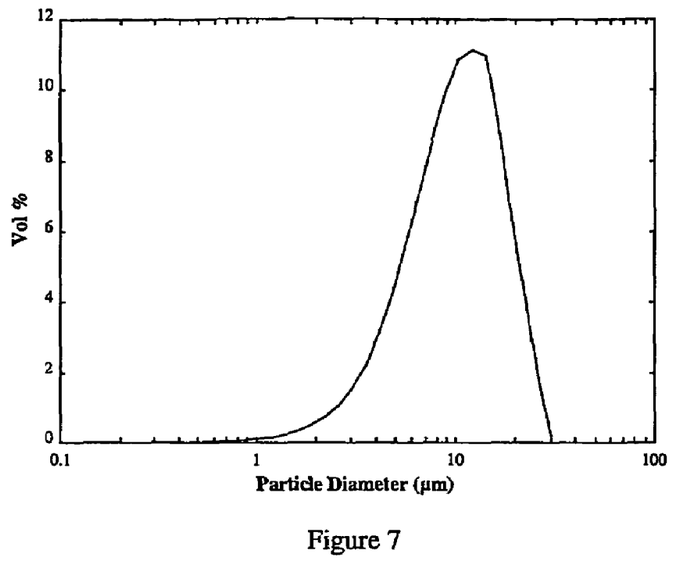
FIG. 7 is a graphical representation showing the size distribution of plate-like particles of FIG. 6; and, FIG. 8 is a Scanning Electron Micrograph showing alumina particles made in accordance with Counter-example 1 with tabular morphology, low aspect ratio and interlocked clusters.

The resulting powder was heat treated for 2 hours at 780° C. X-ray diffraction and electron microscopy studies confirmed that the resulting material consisted of platelets of alpha alumina 1-30 microns in diameter with thickness 50-200 nm. The particles were essentially individual platelets with low levels of aggregation. FIG. 6 shows a typical scanning electron micrograph of this material. FIG. 7 shows the platelet size distribution of the sample of FIG. 6, determined by laser light scattering.

COUNTER EXAMPLE 1

Use of Insufficient Diluent at Milling Leading to 'tabular' Alumina 520 g aluminium hydroxide as a precursor was milled with 460 g sodium chloride as a diluent and 10 g cryolite as a mineraliser for 1 hour at 500 rpm in a 7 liter attrition mill using 25 kg of 6.35 mm diameter stainless steel balls to form nano-sized particles of aluminium hydroxide. This mass ratio lead to a volume fraction of (sodium chloride/cryolite) diluent of approximately 50%.

Figure 8:
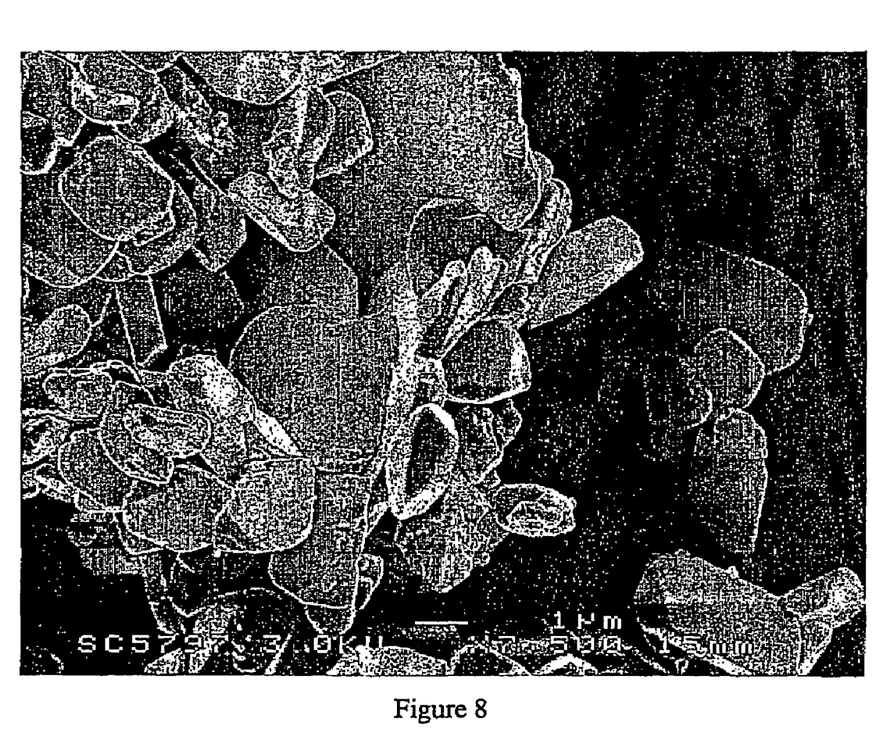

The resulting powder was heat treated for 2 hours at 780° C. X-ray diffraction and electron microscopy studies confirmed that the product of this process consisted of alpha alumina. The particles had tabular morphology with a low aspect ratio and formed interlocked clusters. The plates were 1-5 microns in diameter and 0.25-1 micron thick. FIG. 8 shows a typical scanning electron micrograph of this material.

COUNTER EXAMPLE 2

Removal of Diluent Prior to Heat Treatment, Plate-like Morphology Absent From Product 1.04 g aluminium hydroxide as a precursor was milled with 6.96 g sodium chloride as a diluent for 3 hours in a Spex mixer mill using 80 g of 12.7 mm diameter stainless steel balls.

2 g of the milled powder was washed a single time using 12 ml de-ionised water, with the intention of removing 75% of the sodium chloride diluent. The powder was dried and heat treated at 1300° C. for 1 hour. Any remaining sodium chloride diluent was removed by washing six times with de-ionised water.

X-ray diffraction and electron microscopy studies revealed that the resulting material consisted of porous particles of alpha alumina 10-300 microns in size. Plate-like morphology was not observed.

Now that preferred examples of the present invention have been described along with counter-examples, numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description and the appended claims.

The invention claimed is:

1. A process for the production of plate-like alumina particles comprising the steps of:
    forming a mixture of nano-sized particles of an aluminium precursor compound and a sufficient volume fraction of a diluent, wherein the sufficient volume fraction of the diluent is at least 80% of the total volume of the mixture; and
    heat treating the mixture to form substantially discrete plate-like alpha alumina particles dispersed in the diluent, the plate-like particles having an aspect ratio of width to diameter in the range of 1:10 and 1:100, wherein the step of heat treating the mixture is conducted below the melting point of the diluent.

2. The process for the production of plate-like alumina particles according to claim 1, further comprising the step of removing the diluent after the step of heat treating.

3. The process for the production of plate-like alumina particles according to claim 2, wherein the diluent is soluble in a solvent and the step of removing the diluent from the mixture comprises the step of washing with the solvent after the step of heat treating.

4. The process for the production of plate-like alumina particles according to claim 3, wherein the solvent is water or an alcohol.

5. The process for the production of plate-like alumina particles according to claim 1, wherein the aspect ratio of width to diameter is in the range of 1:20 and 1:50.

6. The process for the production of plate-like alumina particles according to claim 1, wherein the diluent is a metal salt.

7. The process for the production of plate-like alumina particles according to claim 6, wherein the metal salt is selected from the group consisting of sodium sulphate, potassium sulphate, sodium chloride and mixtures thereof.

8. The process for the production of plate-like alumina particles according to claim 1, further comprising the step of adding a mineraliser to the diluent to form a diluent-mineraliser system.

9. The process for the production of plate-like alumina particles according to claim 8, wherein the mineraliser is a metal fluoride.

10. The process for the production of plate-like alumina particles according to claim 8, wherein the metal fluoride is selected from the group consisting of sodium fluoride, calcium fluoride, aluminium fluoride, sodium aluminium fluoride and mixtures thereof.

11. The process for the production of plate-like alumina particles according to claim 8, wherein the step of heat treating the mixture is conducted below the liquidus of the diluent-mineraliser system.

12. The process for the production of plate-like alumina particles according to claim 1, wherein the aluminium precursor compound is selected from the group consisting of aluminium hydroxide, aluminium sulphate, aluminium nitrate, aluminium chloride and mixtures thereof.

13. The process for the production of plate-like alumina particles according to claim 1, wherein the nano-sized particles of the alumina precursor compound are substantially discrete.

14. A process for the production of ultrafine plate-like alumina particles having a high aspect ratio comprising the steps of:
    milling a mixture of an aluminium precursor compound and a sufficient volume fraction of a diluent to form a dispersion of nano-sized particles of an intermediate aluminium compound in the diluent wherein the sufficient volume fraction of the diluent is at least 80% of the total volume of the mixture; and,
    thereafter heat treating the dispersion to convert the nano-sized particles of the intermediate aluminium compound to substantially discrete plate-like particles of alpha alumina, the plate-like particles having an aspect ratio of width to diameter in the range of 1:10 and 1:100, wherein the step of heat treating the mixture is conducted below the melting point of the diluent.

15. The process for the production of plate-like alumina particles according to claim 14, further comprising the step of removing the diluent from the mixture after the step of heat treating.

16. The process for the production of plate-like alumina particles according to claim 15, wherein the step of removing the diluent comprises the step of washing with a solvent which selectively dissolves the diluent while not reacting with the plate-like alumina particles.

17. The process for the production of plate-like alumina particles according to claim 14, wherein the precursor aluminium compound is aluminium hydroxide or aluminium oxide.

* * * * *

UNITED STATES PATENT AND TRADEMARK OFFICE
CERTIFICATE OF CORRECTION

PATENT NO. : 7,575,736 B2
APPLICATION NO. : 10/541471
DATED : August 18, 2009
INVENTOR(S) : Robinson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Seventh Day of September, 2010

David J. Kappos
*Director of the United States Patent and Trademark Office*